US012133033B2

(12) United States Patent
Kimbell, III

(10) Patent No.: US 12,133,033 B2
(45) Date of Patent: Oct. 29, 2024

(54) CUSTOMIZABLE SPEAKER SYSTEM

(71) Applicant: Concierge Audio LLC, Covington, GA (US)

(72) Inventor: Richard Guy Kimbell, III, Covington, GA (US)

(73) Assignee: Concierge Audio LLC, Covington, GA (US)

( * ) Notice: Subject to any disclaimer, the term of this patent is extended or adjusted under 35 U.S.C. 154(b) by 233 days.

(21) Appl. No.: 18/046,005

(22) Filed: Oct. 12, 2022

(65) Prior Publication Data

US 2024/0129654 A1 Apr. 18, 2024

(51) Int. Cl.
*H04R 1/02* (2006.01)
*H04R 9/06* (2006.01)

(52) U.S. Cl.
CPC .................................... *H04R 1/02* (2013.01)

(58) Field of Classification Search
CPC ........................................................ H04R 1/02
See application file for complete search history.

(56) References Cited

U.S. PATENT DOCUMENTS 3,701,016 A * 10/1972 Bennett ................ H04B 1/3833 455/90.3
D253,109 S 10/1979 Kashidaira
5,000,286 A * 3/1991 Crawford ............... H04R 1/403 181/150
5,996,728 A * 12/1999 Stark ...................... H04R 1/028 248/323
6,142,254 A 11/2000 Claybaugh et al.
2010/0215205 A1* 8/2010 Nagao ...................... H04R 1/26 381/388
2013/0177196 A1 7/2013 Lee
2013/0301862 A1* 11/2013 Adamson ............... H04R 1/403 381/332

(Continued)

FOREIGN PATENT DOCUMENTS

CN 113865236 A 12/2021
CN 216557529 U 5/2022
TW 332408 U 5/2008

OTHER PUBLICATIONS

DIY Audio, "Speaker Grills—DIY Magnetic Speaker Grills—Easy Build", Nov. 7, 2021, available at https://www.youtube.com/watch?v=QrxsEQJEIw0.

*Primary Examiner* — Simon King
(74) *Attorney, Agent, or Firm* — Briggs IP; Jeremy A. Briggs

(57) ABSTRACT

A consumer product cabinet is disclosed. The consumer product cabinet may be a speaker cabinet. The cabinet may include a plurality of planar side surfaces. Each planar side surface may be attached to adjacent planar side surfaces at a predefined angle along a planar side surface height. The predefined angle may be 90 degrees. The cabinet may further include a plurality of support members. Each support member may be disposed at an intersection of the adjacent planar side surfaces. Further, each support member may be configured to generate recesses along the planar side surface height. Furthermore, the cabinet may include a plurality of replaceable exterior panels configured to removably attach to the plurality of planar side surfaces via the recesses. A recess depth may be equal or equivalent to a replaceable exterior panel thickness.

20 Claims, 7 Drawing Sheets

(56) References Cited

U.S. PATENT DOCUMENTS

| | | | | |
|---|---|---|---|---|
| 2013/0306399 | A1* | 11/2013 | Swan | H04R 1/026 181/199 |
| 2015/0237424 | A1* | 8/2015 | Wilker | H04R 1/323 381/150 |
| 2016/0366775 | A1* | 12/2016 | Kolton | H05K 11/00 |

* cited by examiner

CUSTOMIZABLE SPEAKER SYSTEM

TECHNICAL FIELD

The present disclosure relates to a speaker system, and more specifically to a customizable speaker cabinet that enables users to replace exterior cabinet panels and change speaker system appearance.

BACKGROUND

Most consumer electronic products, such as speakers, refrigerators, microwave, computers, laptops, tablets, etc., are available to users in a variety of designs, shapes, and colors. A user may select and purchase a product from several available options.

Typically, the consumer electronic products have a long lifespan and are expensive. Therefore, users generally do not purchase these products frequently. For example, if the user purchases an expensive speaker, the user may not replace the speaker for months or even years.

Most consumer electronic products have static designs that do not change over products' lifespan. Therefore, if the user intends to change an exterior design or appearance of a product that the user may have purchased, the user may be required to replace the product with a new version. For example, if the user changes user's home décor, the user may want to change the product look to match with the new home décor. In this case, the user may have to purchase a new product, which may have a look that matches the new home décor.

Purchasing new products frequently may cause inconvenience to users and may not be financially viable. Thus, there is a need for a system that enables the users to conveniently change a product appearance, without replacing the product.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a consumer electronic product cabinet. The cabinet may enclose a consumer electronic product, e.g., a speaker. The cabinet may have a shape of a cube, a cuboid, a triangular prism, a pentagonal prism and the like. The cabinet may include a plurality of planar side surfaces. For example, the cabinet may include a front surface, a back surface, a left surface, and a right surface, when the cabinet is shaped as a cube or a cuboid. Each planar side surface may be attached to adjacent planar side surfaces at a predefined angle (e.g., 90 degrees). The cabinet may further include a plurality of replaceable exterior panels that may be affixed to the plurality of planar side surfaces through a connection mechanism. The connection mechanism may include, for example, magnet and metal connection means, post and hole arrangement and/or the like. A user may replace one or more replaceable exterior panels to change a cabinet appearance.

In some aspects, the cabinet may include a plurality of support members that may be disposed at an intersection of adjacent planar side surfaces. Each support member may be configured to generate recesses along a planar side surface height, width, and length. The plurality of replaceable exterior panels may affix to the plurality of planar side surfaces via the recesses. In one or more aspects, a recess depth may be equal or equivalent to a replaceable exterior panel thickness. Therefore, the replaceable exterior panel remains flush on the cabinet, without any visible seams.

The cabinet may further include one or more constrained layers of damping material that may be attached to the replaceable exterior panels and/or the planar side surfaces. The constrained layers may be attached to the panels and/or the planar side surfaces such that the layers are disposed between the panels and the planar side surfaces. The constrained layers trap and dissipate vibrations when the user operates the speaker, thus reducing acoustic interference in the cabinet.

The present disclosure discloses a speaker cabinet that enables the user to change an exterior cabinet design/appearance by replacing exterior panels. The user may conveniently change the exterior cabinet appearance as per user's requirements, e.g., when the user changes user's home décor. The user may not be required to change entire speaker system when the user wishes to change the exterior cabinet appearance. Further, the cabinet includes a constrained layer of damping material that minimizes acoustic interference and thus results in high quality sound output from the speaker cabinet.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 1:
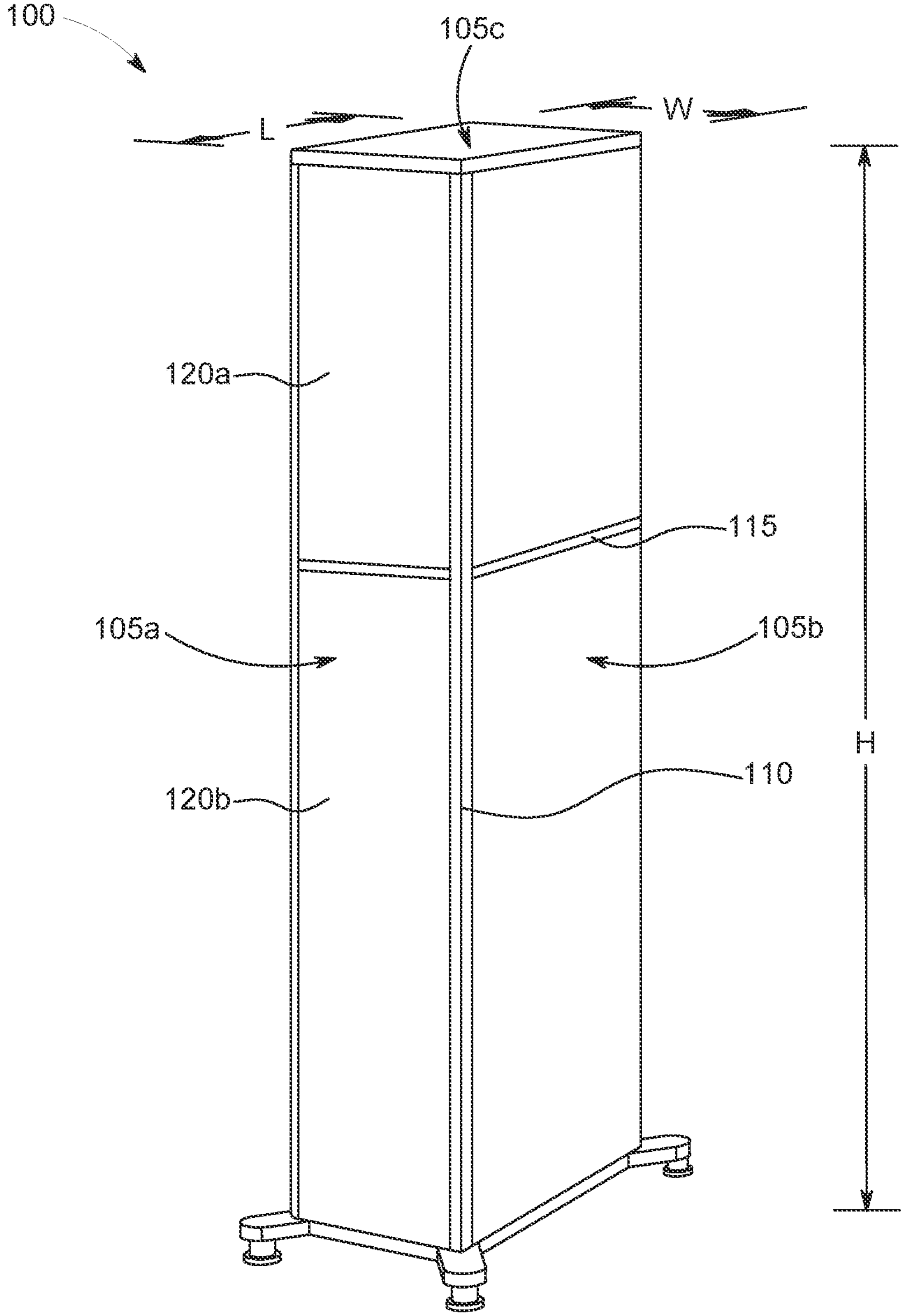
FIG. 1 depicts an example consumer product cabinet in accordance with the present disclosure.

FIG. 1 depicts an example consumer product cabinet 100 in accordance with the present disclosure. The cabinet 100 may be configured to enclose a consumer electronic product (not shown), such as a speaker, a refrigerator, an air purifier and the like. For the description of the present disclosure, the cabinet 100 may be assumed to be attached to a speaker. In some aspects, the cabinet 100 may be part of a speaker system in which the cabinet 100 may form an exterior speaker surface. A user may use the cabinet 100 to change a speaker system appearance, without requiring changing the speaker system. Specifically, cabinet exterior surface may be customizable, and the user may replace the cabinet exterior surface to change a cabinet appearance (and hence, the speaker system appearance).

The cabinet 100 may be of any shape including, but not limited to, a cube, a cuboid, a triangular prism, a pentagonal prism, a hexagonal prism and the like. In an exemplary aspect, cabinet shape may be based on speaker shape. In an exemplary embodiment shown in FIG. 1, the cabinet 100 may have a shape of a cuboid and a cabinet height "H" greater than a cabinet width "W" and/or length "L".

In some aspects, the cabinet 100 may have a plurality of planar surfaces that may form the cuboid surfaces. The plurality of planar surfaces may include a plurality of planar side surfaces (including a front surface 105*a*, a back surface, a left side surface and a right-side surface 105*b*), a top surface 105*c* and a bottom surface. Each planar surface may be rectangular and may be attached to adjacent planar surfaces at a predefined angle along a planar surface height, width, or length. For a cuboidal cabinet (e.g., the cabinet 100), the predefined angle may be 90 degrees.

The cabinet 100 may include a plurality of support members, which may include a plurality of vertical support members 110 and a plurality of horizontal support members 115. In some aspects, dimensions (e.g., height and thickness) of each vertical support member 110 may be same or equivalent. Similarly, dimensions (e.g., length/width and thickness) of each horizontal support member 115 may be same or equivalent. In some aspects, the plurality of vertical support members 110 and the plurality of horizontal support members 115 may be made of same material including, but not limited to, wood, metal, acrylic and/or the like. In other aspects, the plurality of vertical support members 110 and the plurality of horizontal support members 115 may be made from different materials.

In some aspects, each horizontal support member 115 may be disposed on top edges (or intersections along planar side surface length and width) of each planar side surface and/or on the plurality of planar side surfaces dividing the plurality of planar side surfaces into two parts along the planar side surface height. In an exemplary aspect, one or more horizontal support members 115 may be disposed at a center position of each planar side surface. Alternatively, the horizontal support member 115 may be disposed towards a cabinet top side or a cabinet bottom side. In further aspects, the horizontal support member 115 may be disposed on one or more planar side surfaces and not on all planar side surfaces. For instance, the horizontal support member 115 may be disposed on the front surface 105*a* and/or the back surface and may not be disposed on the left side surface and/or the right side surface 105*b*. In some aspects, the horizontal support member 115 position may be based on cabinet 100 shape, design and/or size.

Further, each vertical support member 110 may be disposed at an intersection of adjacent planar side surfaces along a planar side surface height. Stated another way, the vertical support members 110 may be disposed at four cabinet 100 corners along the cabinet height "H", as shown in FIG. 1. In further aspects, the vertical support members 110 may be configured to generate recesses (not shown) along the planar side surface height. The details of recesses are described in conjunction with FIGS. 4 and 5.

In some aspects, the cabinet 100 may further include a plurality of replaceable exterior panels including upper panels 120*a* and lower panels 120*b* (collectively referred to as a panel 120), which may be separated by the horizontal support member 115. Stated another way, each planar side surface may have an upper panel 120*a* and a lower panel 120*b*. In other aspects, the front surface 105*a* may have one lower panel 120*b* (not shown) and other surfaces may have both the upper panel 120*a* and the lower panel 120*b*. In additional aspects, the cabinet 100 may have a single panel 120 on each planar side surface.

In some aspects, the upper panel 120*a* and the lower panel 120*b* may have same dimensions (e.g., height and width). Alternatively, the upper panel 120*a* and the lower panel 120*b* may have different dimensions. In some aspects, the upper panel 120*a* may have smaller height than a lower panel 120*b* height. In other aspects, the upper panel 120*a* may have greater height than the lower panel 120*b* height.

A person ordinarily skilled in the art may appreciate that the upper panel 120*a* height and the lower panel 120*b* height may be based on the horizontal support member 115 position along the planar side surface height. For instance, when the horizontal support member 115 is positioned at a planar side surface center, the upper panel 120*a* height may be same as the lower panel 120*b* height. In other aspects, when the horizontal support member 115 is positioned towards a planar side surface top, the upper panel 120*a* height may be smaller than the lower panel 120*b* height.

In some aspects, the panel 120 may be rectangular (or any other shape based on the cabinet 100 shape) and may be configured to removably attach to a planar side surface via the recesses formed by the vertical support members 110. In some aspects, each panel 120 may include a substrate and a veneer. The substrate may include wood, metal, acrylic, polycarbonate and/or the like. The veneer may be a decorative covering that may be applied to the substrate. The veneer may include, but not limited to, a wood veneer, a metal veneer, a leather veneer and/or the like. Further, a panel 120 thickness may be equivalent to a depth of a recess. Therefore, the panel 120 may remain flush on a planar side surface without visible seams on the cabinet 100, when the panel 120 attaches to the planar side surface via the recesses.

In some aspects, the user may detach the panel 120 from the recesses and replace the panel 120 with a new panel of a different design/appearance/material, which may enable the user to change the cabinet appearance. Therefore, the user may change the cabinet appearance, and hence the speaker system appearance, by replacing the panel 120. In this manner, the user may change the speaker system appearance, without requiring purchasing a new speaker system.

Figure 2:
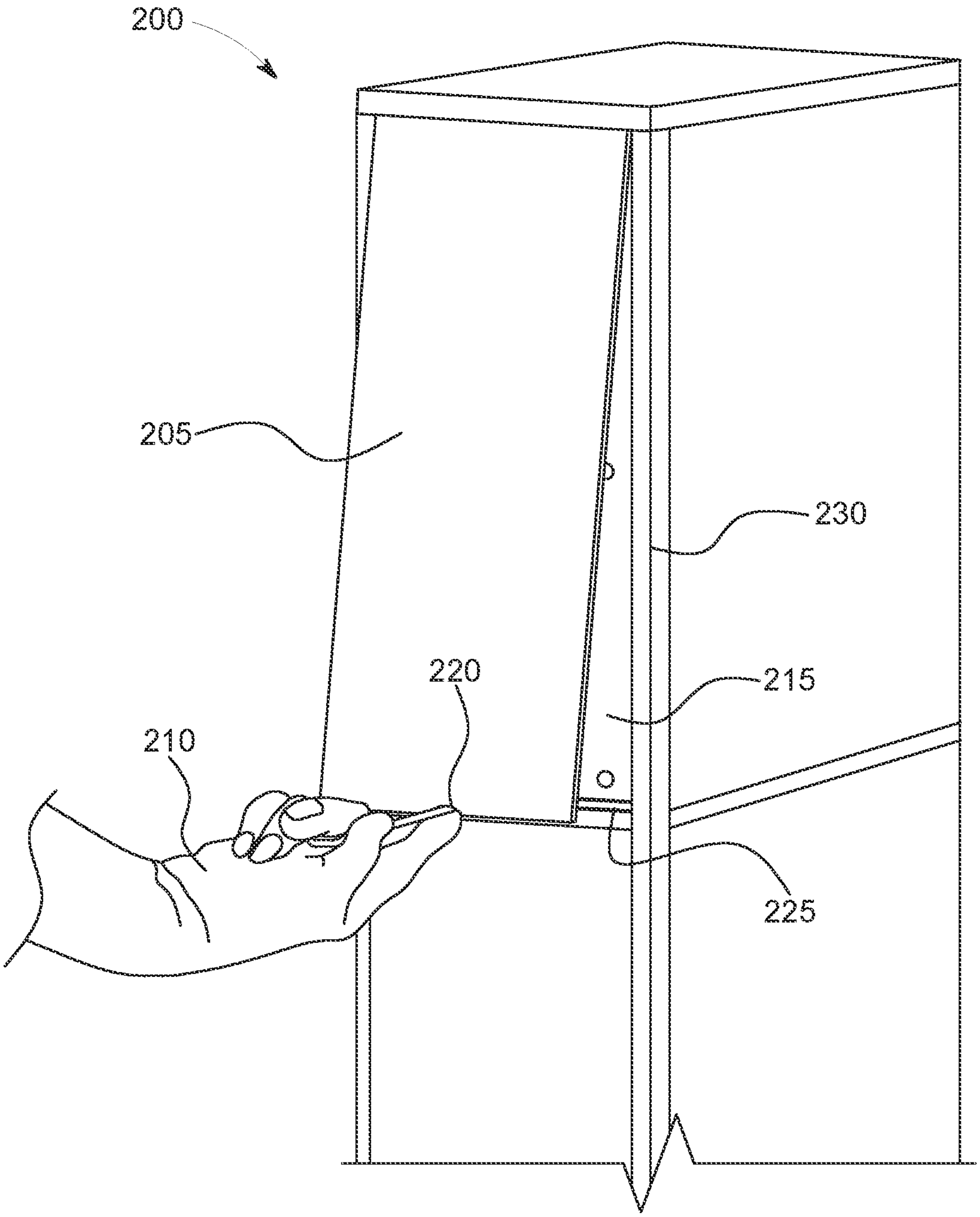
FIG. 2 depicts an example speaker cabinet having a customizable speaker panel in accordance with the present disclosure.

FIG. 2 depicts an example speaker cabinet 200 having a customizable speaker panel 205 in accordance with the present disclosure. The cabinet 200 may be same as the cabinet 100 and the customizable speaker panel 205 (or the panel 205) may be same as the panel 120. As described above, the panel 205 may be a replaceable panel.

In some aspects, a user 210 may couple/decouple the panel 205 on/from a planar side surface side 215. For example, the user 210 may decouple the panel 205 from the planar side surface side 215 and may replace the panel 205 with a new panel of a different design or appearance. The new panel may have same or equivalent dimensions (e.g., height and width) as the panel 205. The user 210 may replace only the panel 205 from the planar side surface side 215 (as shown in FIG. 2) or may replace one or more other panels from one or more other planar side surfaces of the cabinet 200.

In some aspects, each panel 205 may include an opening 220 (or a hole 220). The opening 220 may be located at a bottom center of each panel 205 or at any other location (such as at bottom corners, top center, or top corners). The user 210 may use an opener, such as Allan wrench, a screwdriver, or a paint can opener, and slide under the panel 205 to pull the panel 205 out of a recess 225 that may be formed by a vertical support member 230 (same as the vertical support member 105). In other aspects, the panel 205 may include a metal piece (or a plurality of metal pieces, not shown), which may enable the user 210 to use a magnet (such as an external magnet, not shown) and pull the panel 205 out of the recess 225. In this case, the panel 205 may not have the opening 220.

The panel 205 may be removably coupled with the cabinet 200 by using a connection mechanism. The connection mechanism is described in conjunction with FIG. 3.

Figure 3:
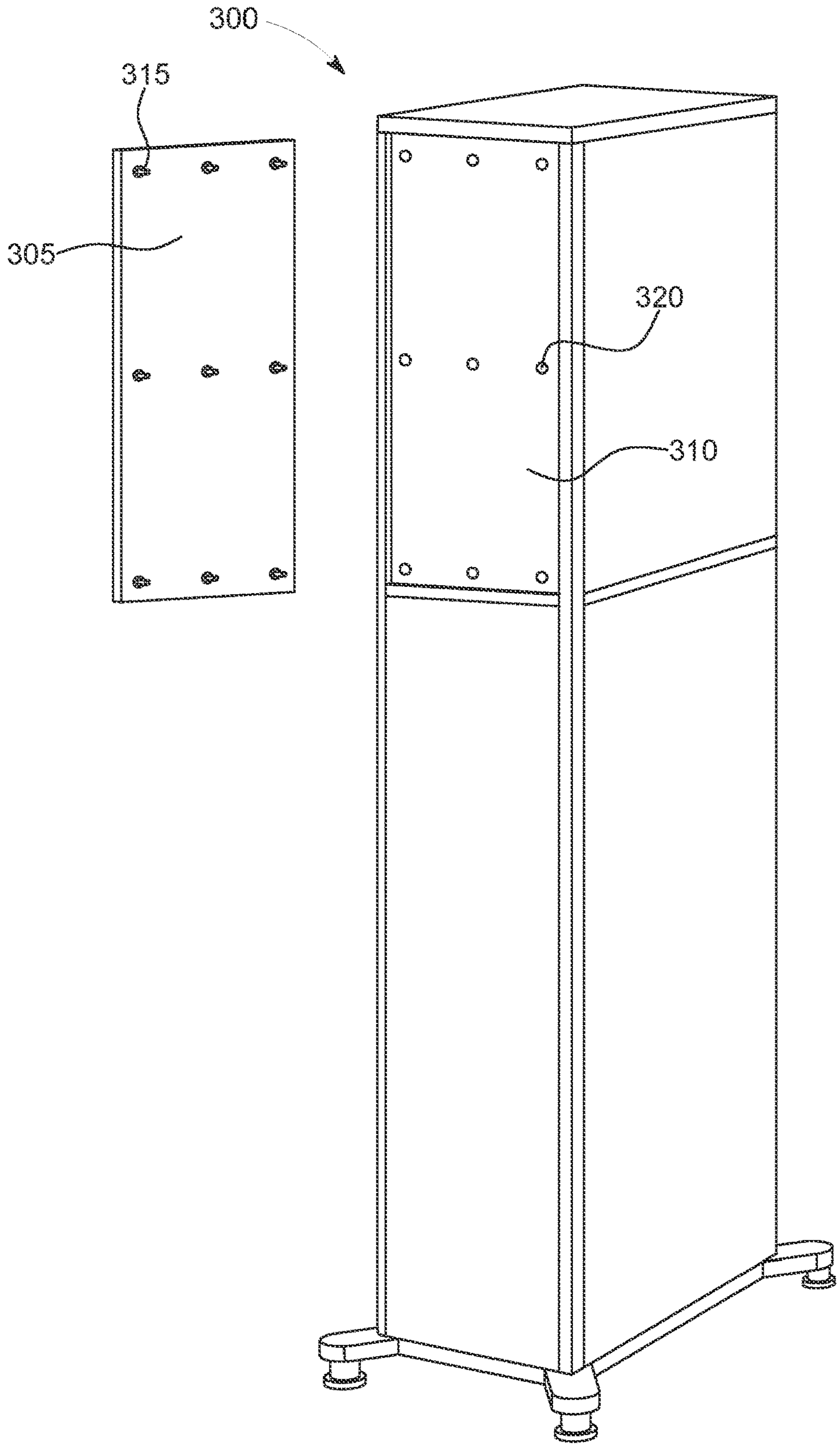
FIG. 3 depicts an example connection mechanism to couple/decouple a panel from a speaker cabinet in accordance with the present disclosure.

FIG. 3 depicts an example connection mechanism to couple/decouple a panel 305 from a speaker cabinet 300 in accordance with the present disclosure. The cabinet 300 may be same as the cabinets 100 or 200 and the panel 305 may be same as the panels 120 or 205.

The cabinet 300 may include a planar side surface 310 (same as the planar side surface, e.g., the front surface 105*a*, described in FIG. 1) which may couple with the panel 305. In some aspects, the planar side surface 310 may be made from wood, metal and the like.

In an exemplary aspect, the panel 305 may include a plurality of male attachment members 315 and the planar side surface 310 may include a plurality of female attachment members 320. The panel 305 may be removably attach to the planar side surface 310 by using the male attachment members 315 and the female attachment members 320. In some aspects, the male attachment members 315 may include posts or any other member. The posts may be of any shape and material. In further aspects, the plurality of female attachment members 320 may include holes in which the posts may be inserted. The male attachment members 315 may be evenly distributed on the panel 305.

In an exemplary aspect, the male attachment members 315 may be nine in number, as shown in FIG. 3. Three male attachment members 315 may be disposed near a panel top edge (one on each corner and one in middle), three male attachment members 315 may be disposed near a panel bottom edge (one on each corner and one in middle) and three male attachment members 315 may be disposed in middle and parallel with the male attachment members located near the panel top and bottom edges. A person ordinarily skilled in the art may appreciate that the panel 305 may include more or fewer male attachment members, without departing from the present disclosure scope.

Similarly, the planar side surface 310 may have nine corresponding female attachment members 320. The female attachment members 320 may be in correspondence with the male attachment members 315. For instance, three female attachment members 320 may be located near a side surface top edge (one on each corner and one in middle), three female attachment members 320 may be located near a side surface bottom edge (one on each corner and one in middle) and three female attachment members 320 may be disposed between and parallel with the female attachment members located near the side surface top and bottom edges.

In an alternative aspect (not shown), the panel 305 may include the female attachment members 320 and the planar side surface 310 may include the male attachment members 315.

In further aspects, the planar side surface 310 may include cavities (e.g., the female attachment members 320 may be holes 320) and the cavities may enclose magnets. The magnets may remain flush in the holes 320 so that the planar side surface 310 may have a smooth finish. Further, the panel 305 may have corresponding metal plates (not shown) that may be attracted to the magnets installed in the holes 320. The metal plates may be mounted on a panel substrate (not shown) such that the metal plates remain flush in the panel substrate. The panel 305 may removably attach to the planar side surface 310 by using the magnets and the metal plates.

The metal plates may be located throughout the panel 305 or may be positioned at predetermined locations. For example, the metal plates may be located at positions corresponding to the holes 320/magnets positions. Stated another way, the metal plate position may be based on hole 320/magnet position in the planar side surface 310.

In additional aspects, the planar side surface 310 and/or the panel 305 may use a damping mechanism to suppress vibrations in the speaker system, when the speaker system is in operation. Specifically, to ensure that the panel 305 does not vibrate and/or create acoustic interference when the user operates the speaker system enclosed in the cabinet 300, the planar side surface 310 and/or the panel 305 may include a constrained layer of damping material. In some aspects, the planar side surface 310 may include the constrained layer. In other aspects, the panel 305 may include the constrained layer. In yet another aspect, both the panel 305 and the planar side surface 310 may include respective constrained layers. The constrained layer may include a layer of high damping material (such as viscoelastic or other damping material) sandwiched between two metal sheets. The damping material may trap and dissipate the vibrations in the damping material, thus suppressing vibrations in the cabinet 300.

The constrained layer may be attached to the panel 305 or the planar side surface 310 such that the constrained layer is disposed between the panel 305 and the planar side surface 310. Further, the constrained layer may be attached to one or more panels 305 or one or more planar side surfaces 310 of the cabinet 300. In other aspects, the constrained layer may be attached to all panels 305 or all planar side surfaces 310. A person ordinarily skilled in the art may appreciate that the constrained layer may be placed in any combination between the planar side surfaces 310 and the panel 305, which may be based on speaker system vibration damping requirements.

Furthermore, in some aspects, the constrained layer may completely cover the planar side surfaces 310 or the panel 305. In other aspects, the constrained layer may be disposed on a planar side surface portion or a panel portion. For instance, the constrained layer may be disposed on a planar side surface center portion or a panel center portion. Further, the constrained layer may be of any shape, including, but not limited to, square, rectangular, circular, oval and the like.

Figure 4:
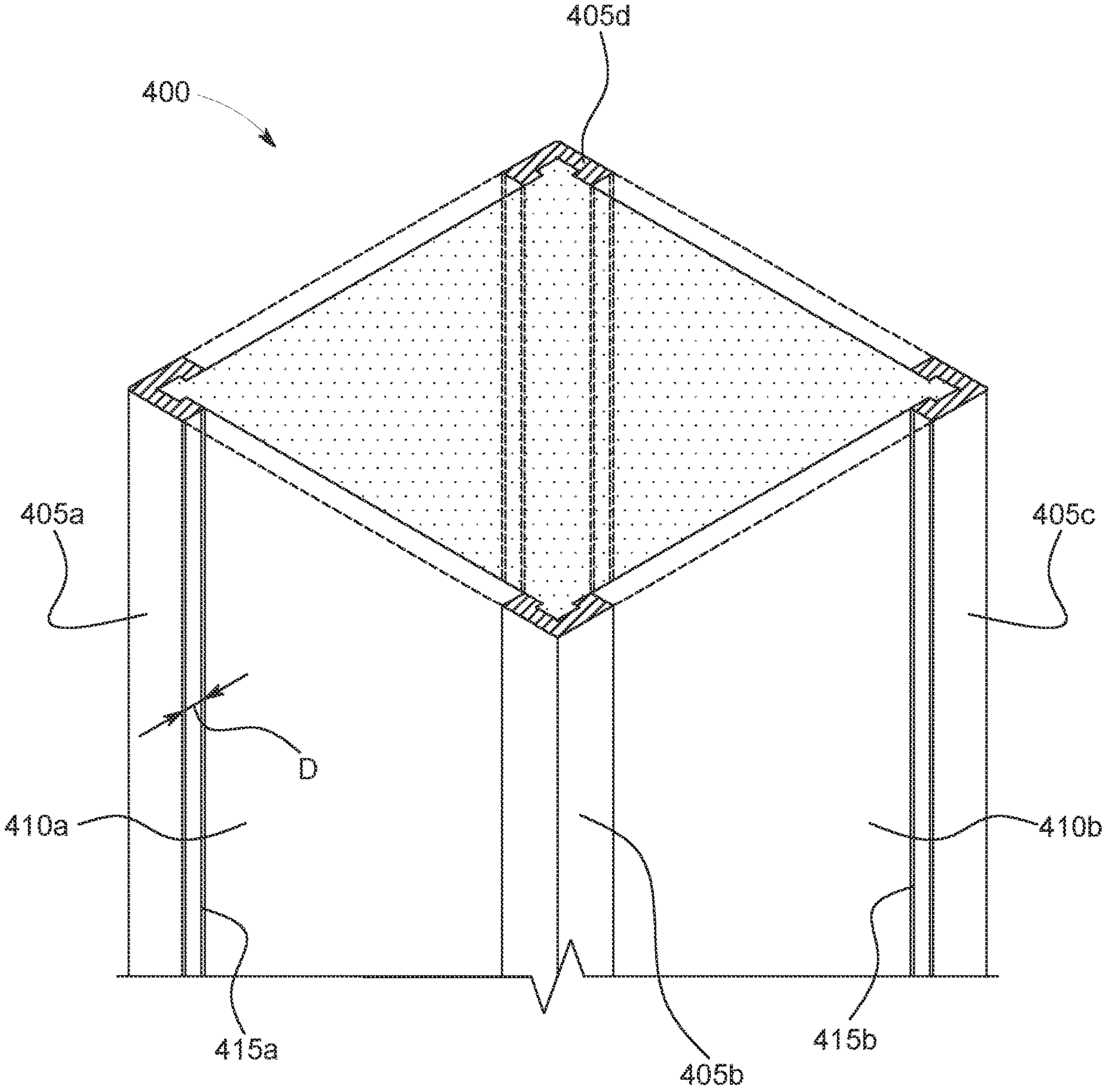
FIG. 4 depicts an example speaker cabinet with support members in accordance with the present disclosure.

FIG. 4 depicts an example speaker cabinet 400 with support members 405*a*, 405*b*, 405*c*, 405*d* (or support members 405) in accordance with the present disclosure. The cabinet 400 may be same as the cabinets 100, 200 or 300 and the support members 405 may be same as the plurality of vertical support members 110 described in conjunction with FIG. 1.

The cabinet 400 may include four support members 405 (or four frames 405) that may be disposed on cabinet 400 corners along the cabinet 400 height. Specifically, the frames 405 may be disposed vertically at the intersection of planar side surfaces 410*a*, 410*b* (collectively referred to as the planar side surfaces 410) along the planar side surface 410 height. The frames 405 may be made of metal, wood and/or the like. A frame height may be equal or equivalent to the cabinet 400 height.

In accordance with the present disclosure, the frames 405 may be configured to create a consistent height/width/depth recess 415*a*, 415*b* (or recess 415) to which a panel (e.g., the panel 305, not shown in FIG. 4) may be affixed. In some aspects, a panel thickness "D" may be equal or equivalent to a recess depth (hereinafter referred to as recess depth "D"). Thus, the panel 305 may remain flush on the cabinet 400 when the panel 305 is attached to the planar side surface 410.

In some aspects, the panel 305 may include a substrate and a veneer. The substrate may include wood, metal, acrylic, polycarbonate and/or the like. The veneer may be a decorative covering that may be applied to the substrate. In accordance with the present disclosure, a summation of substrate thickness and veneer thickness may be equal to a predefined constant, which may be equal or equivalent to the recess depth "D". In one or more aspects, while manufacturing the panel 305, the substrate may be Computer Numeric Control (CNC) cut to match the substrate thickness and the veneer thick to the recess depth "D", which ensures "no-gap" finish. For instance, if "D" is 6.35 millimeter (mm) and the veneer thickness is 1 mm, the substrate may be milled to a thickness of 5.35 mm. Alternatively, if the veneer thickness is 2 mm, the substrate may be milled to a thickness of 4.35 mm.

Figure 5:
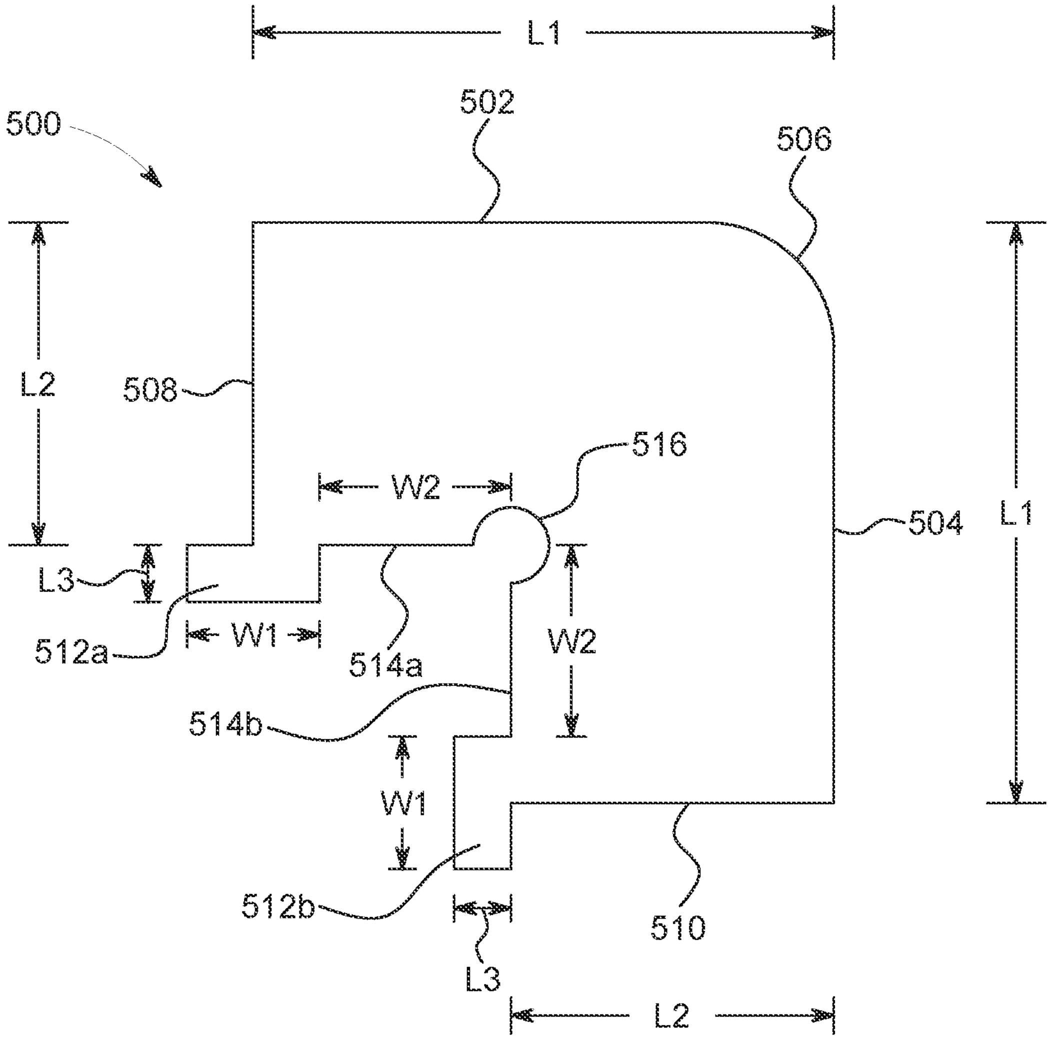
FIG. 5 depicts an example view of a support member in accordance with the present disclosure.

FIG. 5 depicts an example view of a support member (or a frame) 500 in accordance with the present disclosure. In particular, FIG. 5 depicts a top view of the frame 500. The frame 500 may be same as the frame 405.

The frame 500 may have a first exterior surface 502 and a second exterior surface 504. The first exterior surface 502 and the second exterior surface 504 may be located adjacent to each other and form a unitary structure. In some aspects, the first exterior surface 502 and the second exterior surface 504 may be disposed at a predefined angle (e.g., 90 degrees for a cuboidal speaker system cabinet) with respect to each other. The first exterior surface 502 and the second exterior surface 504 may have equal lengths ("L1"). For instance, the first exterior surface 502 and the second exterior surface 504 may have a length L1 in a range of 0.4 inches to 0.7 inches. In an exemplary aspect, the first exterior surface 502 length and the second exterior surface 504 length may be around 0.55 inch.

In one or more aspects, the first exterior surface 502 and the second exterior surface 504 may be connected with each other via a curved surface 506. In an exemplary aspect, curved surface 506 may have a radius in a range of 0.2 inches to 0.3 inches. The curved surface 506 may provide a smooth surface to speaker system cabinet edges (e.g., cabinet 400 edges) and may thus make handling/carrying of the cabinet 400 convenient for a cabinet user.

The frame 500 may further include a third exterior surface 508 and a fourth exterior surface 510. In some aspects, the third exterior surface 508 and the fourth exterior surface 510 form recesses (e.g., the recess 415) along the cabinet 400/planar side surface 410 height. The third exterior surface 508 may be located adjacent and perpendicular to the first exterior surface 502 and may be parallel to the second exterior surface 504. In some aspects, a third exterior surface 508 length ("L2") may be smaller than the second exterior surface 504 length. For instance, the third exterior surface 508 length may be in a range of 0.2 inches to 0.4 inches. In an exemplary aspect, the third exterior surface 508 length may be around 0.30 inches.

Similarly, the fourth exterior surface 510 may be located adjacent and perpendicular to the second exterior surface 504 and may be parallel to the first exterior surface 502. In some aspects, a fourth exterior surface 510 length ("L2") may be smaller than the first exterior surface 502 length ("L1"). For instance, the fourth exterior surface 510 length may be in a range of 0.2 inches to 0.4 inches. In an exemplary aspect, the fourth exterior surface 510 length may be around 0.30 inches. In some aspects, the third exterior surface 508 length and the fourth exterior surface 510 length may be equal.

The third exterior surface 508 and the fourth exterior surface 510 may further have ends 512*a* and 512*b* (collectively referred to as ends 512) that protrude from the third exterior surface 508 and the fourth exterior surface 510 respectively. The ends 512 may be configured to lock the frame 500 at the intersection of the adjacent planar side surfaces (e.g., the planar side surfaces 410) of the speaker system cabinet (e.g., the cabinet 400). In some aspects, the dimensions of the ends 512*a* and 512*b* may be same and the ends 512 may be positioned perpendicular to each other. In further aspects, the end 512*a* may protrude perpendicular to the third exterior surface 508 and the end 512*b* may protrude perpendicular to the fourth exterior surface 510.

The end 512*a* may have a length ("L3") in a range of 0.040 inches to 0.070 inches. In an exemplary aspect, the end 512*a* may be an approximate length of 0.060 inches. The end 512*a* may have a width ("W1") in a range of 0.07 inches to 0.15 inches. In exemplary aspect, the end 512*a* may have an approximate width of 0.12 inches. The end 512*b* may have same or equivalent length and width as length "L3" and width "W1".

The frame 500 may further include a first interior surface 514*a* and a second interior surface 514*b*. The first interior surface 514*a* and the second interior surface 514*b* may be L-shaped interior surface that may be attached to the ends 512. In particular, the first interior surface 514*a* may be connected to the end 512*a* and the second interior surface 514*b* may be connected to the end 512*b*. The first interior surface 514*a* and the second interior surface 514*b* may be connected perpendicular to each other. In some aspects, the first interior surface 514*a* and the second interior surface 514*b* may have same dimensions. For example, a width "W2" of the first interior surface 514*a* and the second interior surface 514*b* may be in range of 0.12 inches to 0.25 inches. In an exemplary aspect, the width W2 may approximately 0.18 inches.

In further aspects, the first interior surface 514*a* and the second interior surface 514*b* may connect with each other via a curved portion 516. In some aspects, the curved portion 516 may be semi-circular in shape and may be configured to form an opening in the frame 500. The opening may allow the cabinet user to pull out the frame 500 from the cabinet 400, if required. The curved portion 516 may have a radius in a range of 0.04 inches to 0.09 inches. In an exemplary aspect, the curved portion 516 may have an approximate radius of 0.06 inches.

Figure 6:
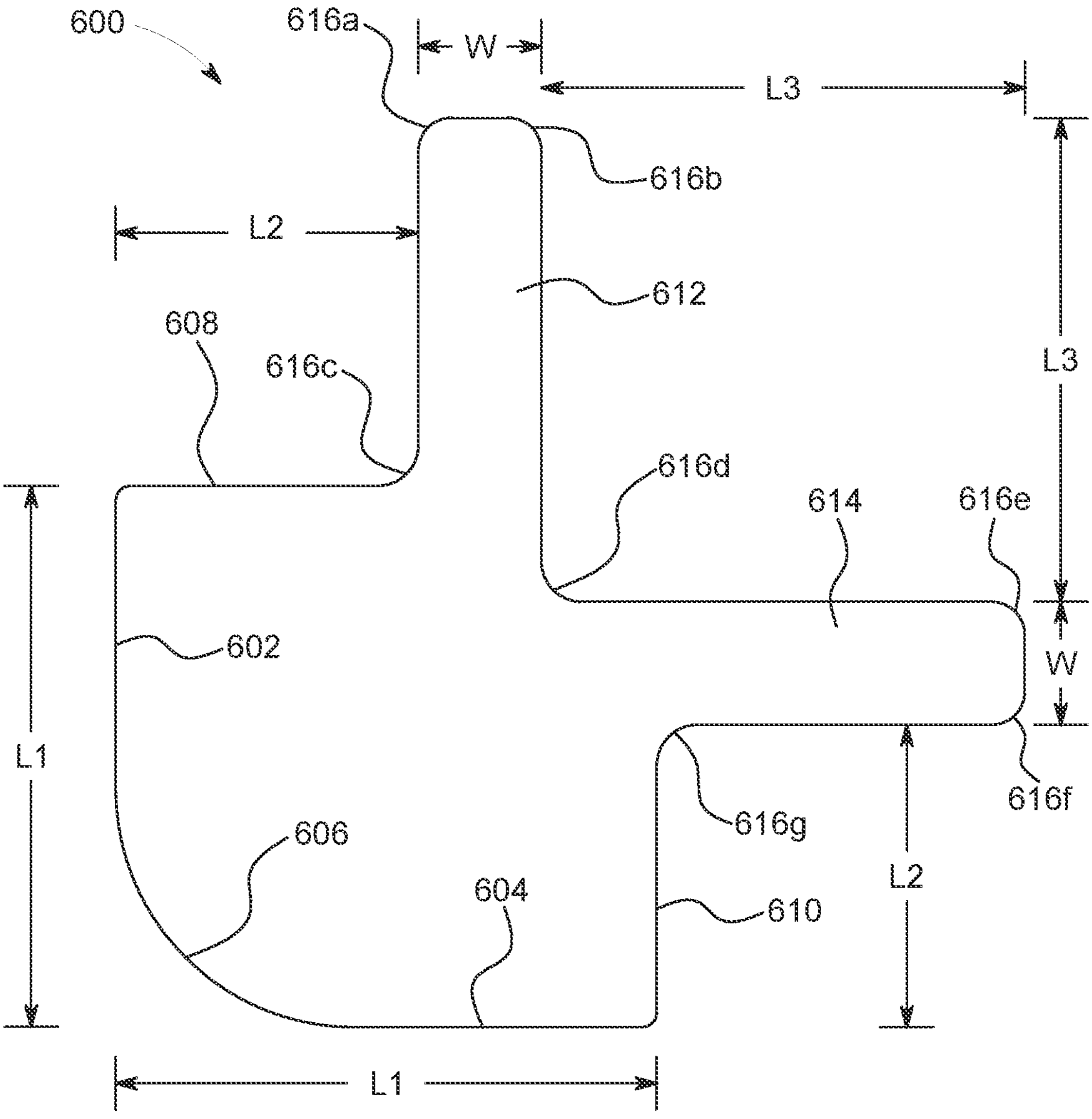
FIG. 6 depicts another example support member in accordance with the present disclosure.

FIG. 6 depicts another example support member (or a frame) 600 in accordance with the present disclosure. In particular, FIG. 6 depicts a top view of the frame 600. The frame 600 may be similar to the frame 405. In some aspects, the frame 600 may be disposed on the cabinet 400 corners along the cabinet 400 height. Further, as discussed above, the frame 600 may create a consistent height/width/depth recess to which a panel may be affixed.

The frame 600 may have a first exterior surface 602 and a second exterior surface 604. The first exterior surface 602 and the second exterior surface 604 may be located adjacent to each other and form a unitary structure. In some aspects, the first exterior surface 602 and the second exterior surface 604 may be disposed at a predefined angle (e.g., 90 degrees for a cuboidal speaker system cabinet) with respect to each other. The first exterior surface 602 and the second exterior surface 604 may have equal lengths ("L1"). For instance, the first exterior surface 602 and the second exterior surface 604 may have a length L1 in a range of 13.5 millimeter (mm) to 14.5 mm. In an exemplary aspect, the first exterior surface 602 length and the second exterior surface 604 length may be around 14.1 mm.

The first exterior surface 602 and the second exterior surface 604 may be connected with each other via a curved surface 606. In an exemplary aspect, the curved surface 606 may have a radius in a range of 6 to 7 mm. The first exterior surface 602, the second exterior surface 604 and the curved surface 606 may collectively form the exterior surface of the frame 600 that may be visible at the cabinet 400 corners.

The frame 600 may further include a third exterior surface 608 and a fourth exterior surface 610. In some aspects, the third exterior surface 608 and the fourth exterior surface 610 may form recesses (e.g., the recess 415) along the cabinet 400/planar side surface 410 height. The third exterior surface 608 may be located adjacent and perpendicular to the first exterior surface 602 and may be parallel to the second exterior surface 604. In some aspects, a third exterior surface 608 length ("L2") may be smaller than the second exterior surface 604 length. For instance, the third exterior surface 608 length may be in a range of 7.8 to 8.2 mm. In an exemplary aspect, the third exterior surface 608 length may be around 7.9 mm.

Similarly, the fourth exterior surface 610 may be located adjacent and perpendicular to the second exterior surface 604 and may be parallel to the first exterior surface 602. In some aspects, a fourth exterior surface 610 length ("L2") may be smaller than the first exterior surface 602 length ("L1"). For instance, the fourth exterior surface 610 length may be in a range of 7.8 to 8.2 mm. In an exemplary aspect, the fourth exterior surface 610 length may be around 7.9 mm. In some aspects, the third exterior surface 608 length and the fourth exterior surface 610 length may be equal or equivalent.

The third exterior surface 608 and the fourth exterior surface 610 may be further connected with a first elongated structure 612 and a second elongated structure 614, respectively. The first elongated structure 612 and the second elongated structure 614 may be disposed perpendicular to the third exterior surface 608 and the fourth exterior surface 610. In some aspects, the first elongated structure 612 and the second elongated structure 614 may be configured to lock the frame 600 at the intersection of the adjacent planar side surfaces (e.g., the planar side surfaces 410) of the speaker system cabinet (e.g., the cabinet 400).

A length "L3" of the first elongated structure 612 and the second elongated structure 614 may be equal or equivalent, and may be in a range of 12 to 13 mm. In an exemplary aspect, the length L3 may be 12.6 mm. Further, a width "W" of the first elongated structure 612 and the second elongated structure 614 may be equal or equivalent, and may be in a range of 3 to 3.2 mm. In an exemplary aspect, the width W may be 3.1 mm.

In further aspects, edges 616*a*, 616*b*, 616*c*, 616*d*, 616*e*, 616*f*, 616*g* (collectively referred to as edges 616) of the first elongated structure 612 and the second elongated structure 614 may be rounded and may have a radius in a range of 0.8 to 1.2 mm. In an exemplary aspect, the edges 616 may have a radius of 1 mm.

Figure 7:
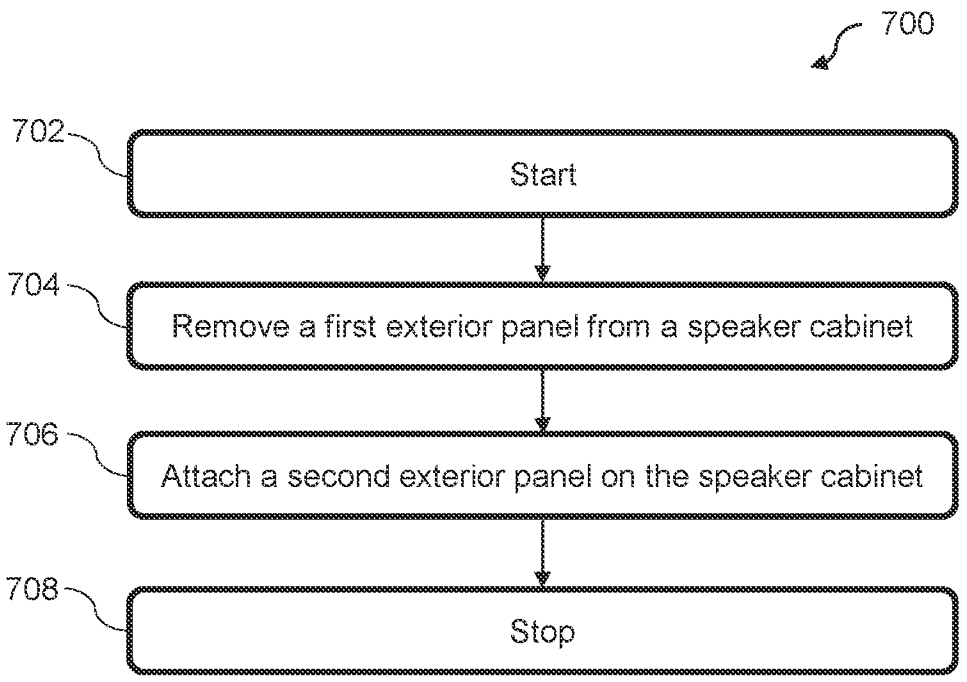
FIG. 7 depicts a flow diagram of a method to replace an exterior panel in a speaker cabinet in accordance with the present disclosure.

FIG. 7 depicts a flow diagram of a method 700 to replace an exterior panel in a speaker cabinet in accordance with the present disclosure. The speaker cabinet may be, for example, the speaker cabinet 100, 200, 300 or 400 described in conjunction with FIGS. 1-4. The exterior panel may be, for example, the panel 120, 205 or 305 described in conjunction with FIGS. 1-4. FIG. 7 may be described with continued reference to prior figures. The following process is exemplary and not confined to the steps described hereafter. Moreover, alternative embodiments may include more or less steps that are shown or described herein and may include these steps in a different order than the order described in the following example embodiments.

At step 702, the method 700 may commence. At step 704, the method 700 may include removing a first exterior panel (such as the panel 120, 205 or 305) from the speaker cabinet. As described above, the first exterior panel may have the opening 220 located at a first exterior panel bottom center. The user 210 may use any opener, such as such as Allan wrench, a screwdriver or a paint can opener, and slide under the first exterior panel to pull the first exterior panel out of the recess 225, as discussed above. In other aspects, the first exterior panel may include a metal piece, which may enable the user 210 to use a magnet and pull the first exterior panel out of the recess 225. In this case, the first exterior panel may not have the opening 220.

At step 706, the method 700 may include attaching a second exterior panel to the speaker cabinet. The second exterior panel may have same dimensions as first exterior panel dimensions. In some aspects, the second exterior panel may have different design, material, or appearance from the first exterior panel. As discussed above, the panel (including the first exterior panel and the second exterior panel) may be removably coupled to the speaker cabinet by using magnets and/or posts.

At step 708, the method 700 may end.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A consumer product cabinet, comprising:

a plurality of planar side surfaces, wherein each planar side surface is attached to adjacent planar side surfaces at a predefined angle along a planar side surface height;

a plurality of support members, wherein each support member is disposed at an intersection of the adjacent planar side surfaces, and wherein each support member is configured to generate recesses along the planar side surface height; and a plurality of replaceable exterior panels configured to removably attach to the plurality of planar side surfaces via the recesses, wherein a recess depth is equal to a replaceable exterior panel thickness.

2. The consumer product cabinet of claim 1, wherein the predefined angle is 90 degrees.

3. The consumer product cabinet of claim 1, wherein the consumer product cabinet is cuboid in shape.

4. The consumer product cabinet of claim 1, wherein the plurality of planar side surfaces and the plurality of replaceable exterior panels are rectangular shaped.

5. The consumer product cabinet of claim 1, wherein the plurality of planar side surfaces comprises female attachment members and the plurality of replaceable exterior panels comprises male attachment members.

6. The consumer product cabinet of claim 5, wherein the plurality of replaceable exterior panels removably attach to the plurality of planar side surfaces via the female attachment members and the male attachment members.

7. The consumer product cabinet of claim 1, wherein the plurality of planar side surfaces comprises magnets and the plurality of replaceable exterior panels comprises metal plates.

8. The consumer product cabinet of claim 7, wherein the plurality of replaceable exterior panels removably attach to the plurality of planar side surfaces via the magnets and the metal plates.

9. The consumer product cabinet of claim 1, wherein each replaceable exterior panel comprises an opening at a replaceable exterior panel bottom center.

10. The consumer product cabinet of claim 1, wherein each replaceable exterior panel comprises a substrate and a veneer.

11. The consumer product cabinet of claim 10, wherein the substrate comprises wood, metal, acrylic, or polycarbonate.

12. The consumer product cabinet of claim 10, wherein a sum of a substrate thickness and a veneer thickness is equal to a predefined constant.

13. The consumer product cabinet of claim 1 further comprises a first dampening material disposed on at least one planar side surface.

14. The consumer product cabinet of claim 1, wherein at least one replaceable exterior panel comprises a second dampening material.

15. The consumer product cabinet of claim 1, wherein the consumer product cabinet is a speaker cabinet.

16. The consumer product cabinet of claim 1 further comprising a horizontal frame configured to divide at least one planar side surface into two parts along the planar side surface height.

17. A consumer product cabinet, comprising:

a plurality of planar side surfaces, wherein each planar side surface is attached to adjacent planar side surfaces at a predefined angle along a planar side surface height;

a plurality of support members, wherein each support member is disposed at an intersection of the adjacent planar side surfaces, and wherein each support member is configured to generate recesses along the planar side surface height, and a plurality of replaceable exterior panels configured to removably attach to the plurality of planar side surfaces via the recesses, wherein a recess depth is equal to a replaceable exterior panel thickness; and a dampening material disposed on at least one of a planar side surface and a replaceable exterior panel.

18. The consumer product cabinet of claim 17, wherein the predefined angle is 90 degrees.

19. The consumer product cabinet of claim 17, wherein each replaceable exterior panel comprises an opening at a replaceable exterior panel bottom center.

20. A method to replace an exterior panel, the method comprising:

removing the exterior panel from a consumer product cabinet, wherein the consumer product cabinet comprises:

a plurality of planar side surfaces, wherein each planar side surface is attached to adjacent planar side surfaces at a predefined angle along a planar side surface height; and a plurality of support members, wherein each support member is disposed at an intersection of the adjacent planar side surfaces, and wherein each support member is configured to generate recesses along the planar side surface height, wherein the exterior panel is configured to removably attach to the plurality of planar side surfaces via the recesses, and wherein a recess depth is equal to an exterior panel thickness; and attaching another exterior panel on the consumer product cabinet via the recesses.

* * * * *